W. E. CHOATE.
MACHINE FOR MARKING ARTICLES.
APPLICATION FILED AUG. 15, 1916. RENEWED JULY 6, 1921.

1,406,537.  Patented Feb. 14, 1922.
7 SHEETS—SHEET 1.

Inventor:
William E. Choate,
by [signature]
Attys.

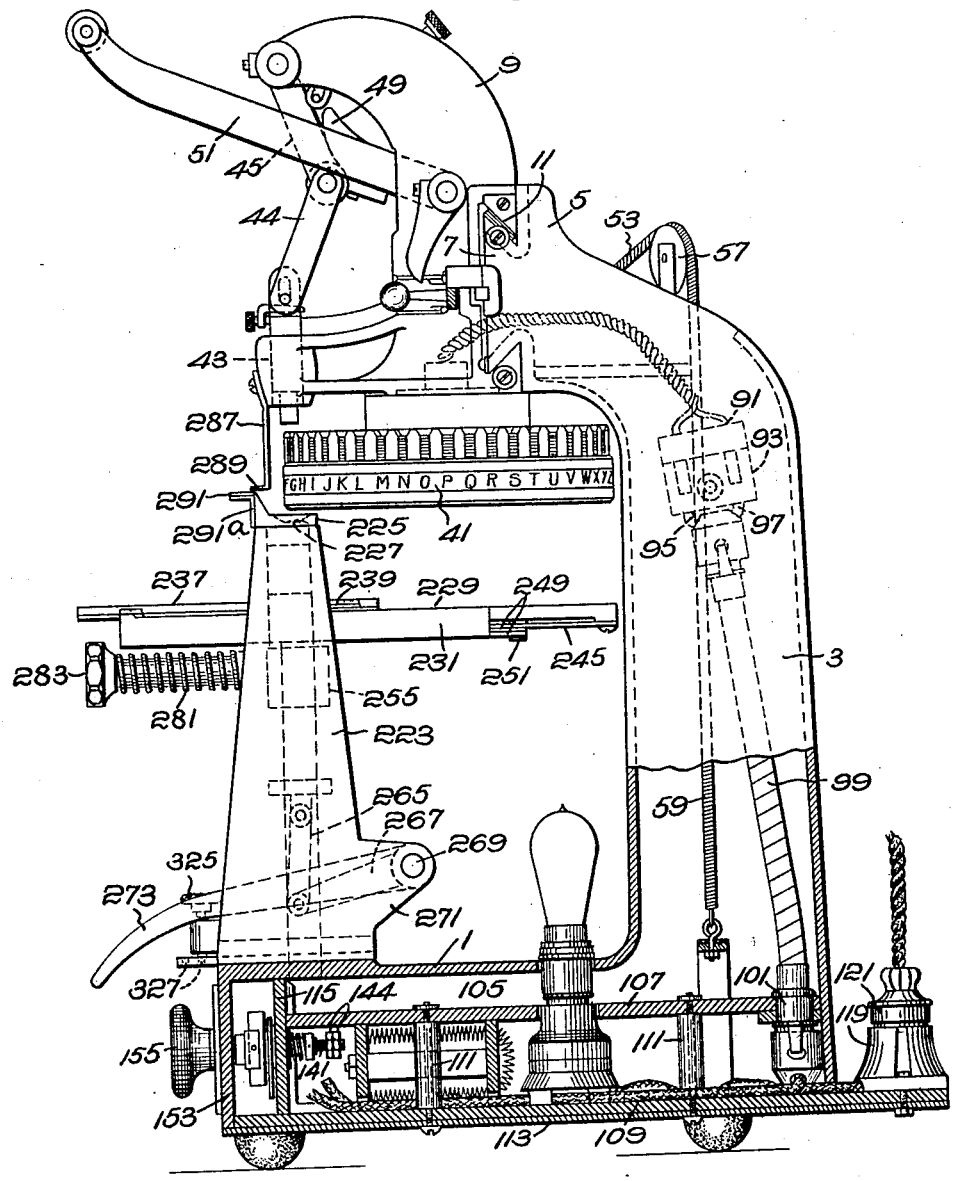

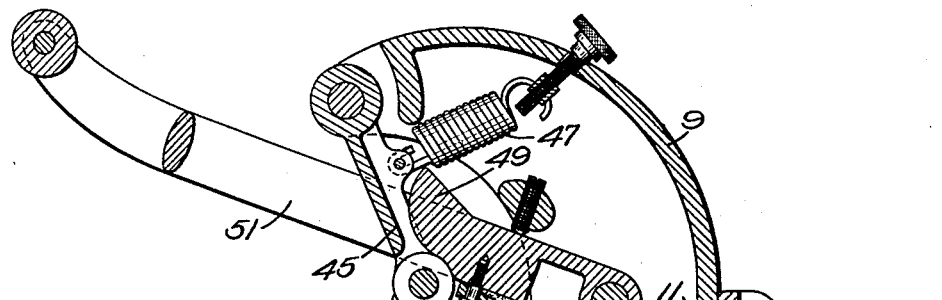
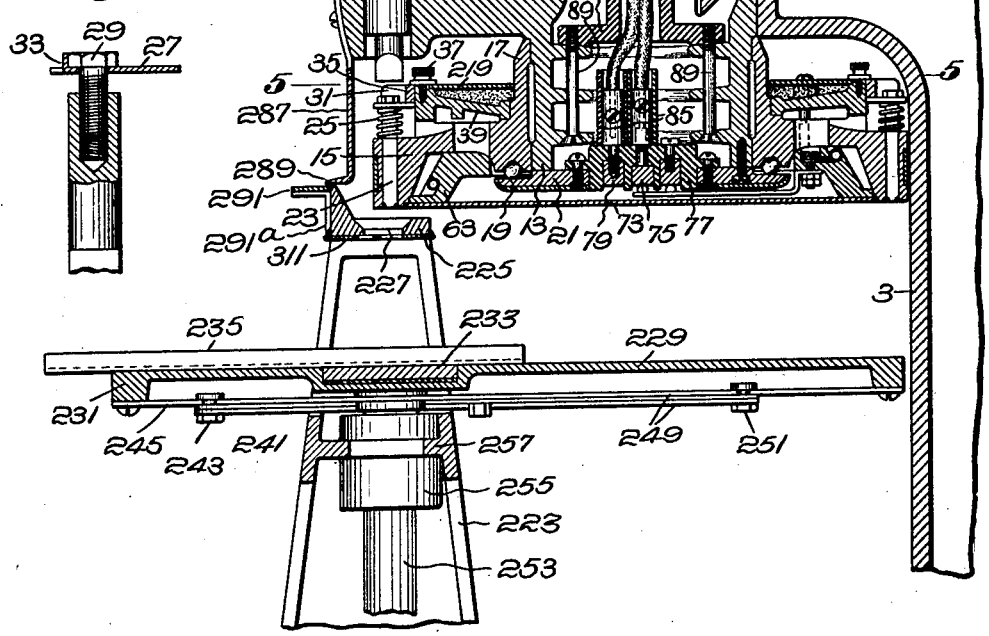

W. E. CHOATE.
MACHINE FOR MARKING ARTICLES.
APPLICATION FILED AUG. 15, 1916. RENEWED JULY 6, 1921.

1,406,537.

Patented Feb. 14, 1922.
7 SHEETS—SHEET 4.

Inventor:
William E. Choate,
by [signature]
Attys.

W. E. CHOATE.
MACHINE FOR MARKING ARTICLES.
APPLICATION FILED AUG. 15, 1916. RENEWED JULY 6, 1921.
1,406,537. Patented Feb. 14, 1922.
7 SHEETS—SHEET 5.
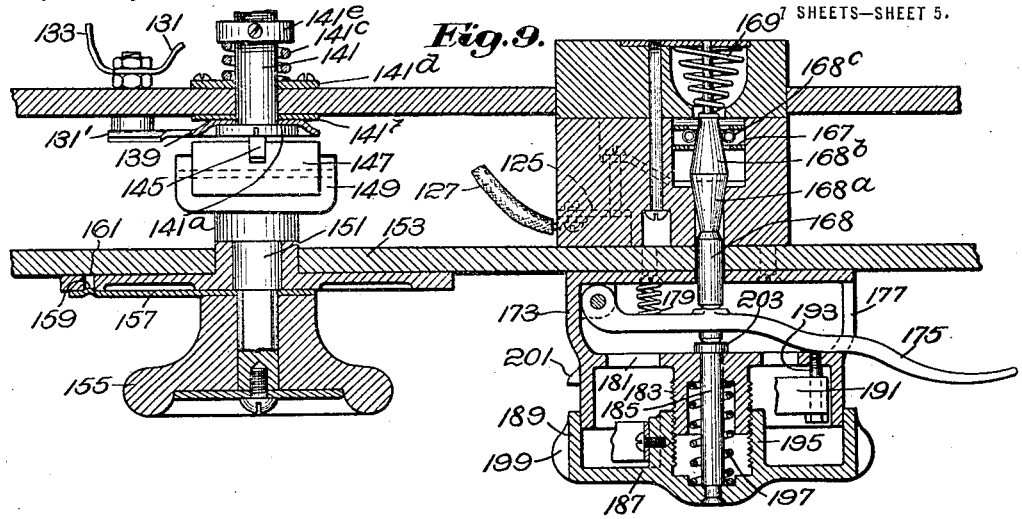
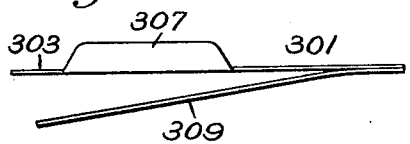
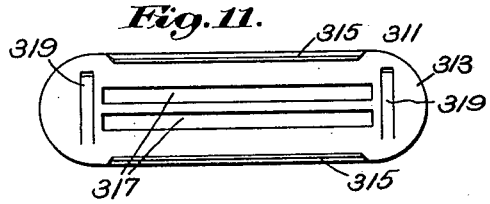
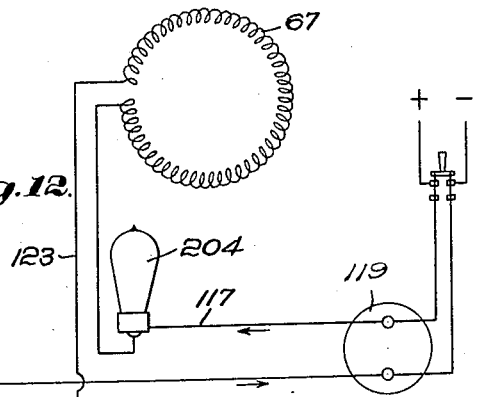
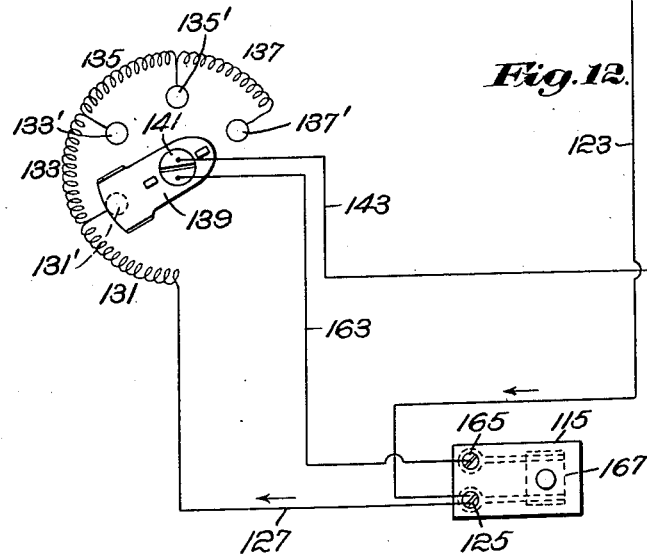
Inventor:
William E. Choate,
by [signature] Attys.

W. E. CHOATE.
MACHINE FOR MARKING ARTICLES.
APPLICATION FILED AUG. 15, 1916. RENEWED JULY 6, 1921.

1,406,537.

Patented Feb. 14, 1922.

Inventor:
William E. Choate,

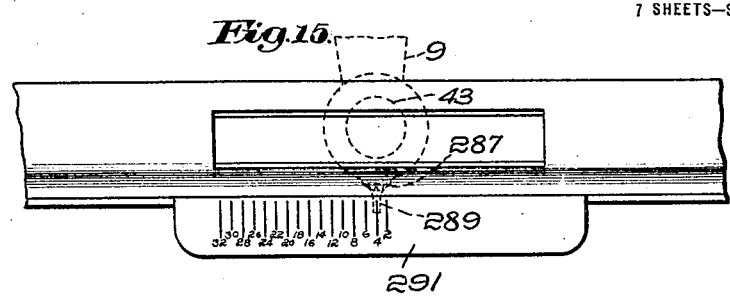
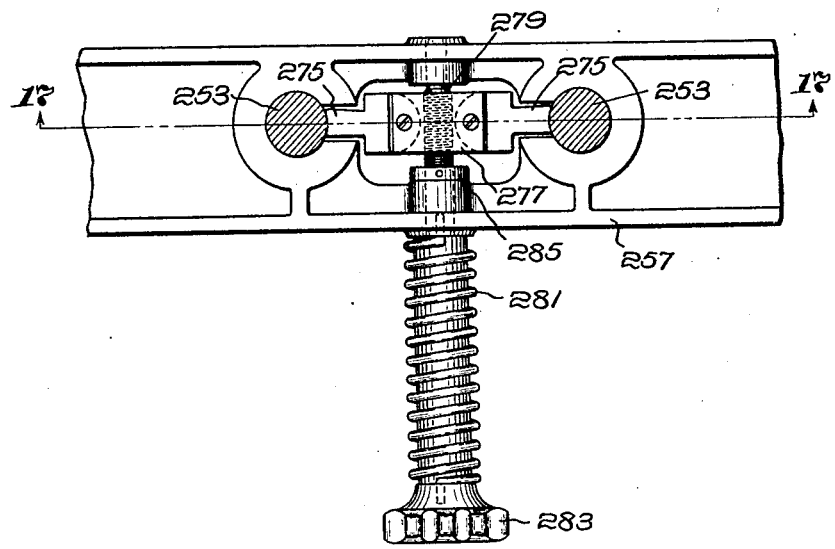
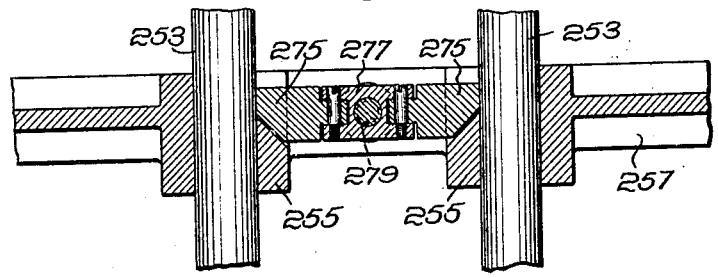

UNITED STATES PATENT OFFICE.

WILLIAM E. CHOATE, OF HAMILTON, MASSACHUSETTS, ASSIGNOR, BY MESNE ASSIGNMENTS, TO FEDERAL FINANCE CORPORATION, A CORPORATION OF MASSACHUSETTS.

MACHINE FOR MARKING ARTICLES.

1,406,537.     Specification of Letters Patent.     Patented Feb. 14, 1922.

Application filed August 15, 1916, Serial No. 115,112. Renewed July 6, 1921. Serial No. 482,870.

*To all whom it may concern:*

Be it known that I, WILLIAM E. CHOATE, a citizen of the United States, and a resident of Hamilton, in the county of Essex and State of Massachusetts, have invented an Improvement in Machines for Marking Articles, of which the following description, in connection with the accompanying drawings, is a specification, like characters on the drawings representing like parts.

This invention is an improvement upon the machine for marking articles shown in Letters Patent of the United States No. 1,128,225 granted to me February 9, 1915, and among other objects provides improved means for controlling the temperature of the tools for marking the articles and improved means for positioning and supporting the articles to be marked.

The character of the invention may be best understood by reference to the following description of the embodiment of the invention shown in the accompanying drawings, wherein,—

Fig. 2 is a view of the machine partly in side elevation and partly in vertical section;

Figure 1:
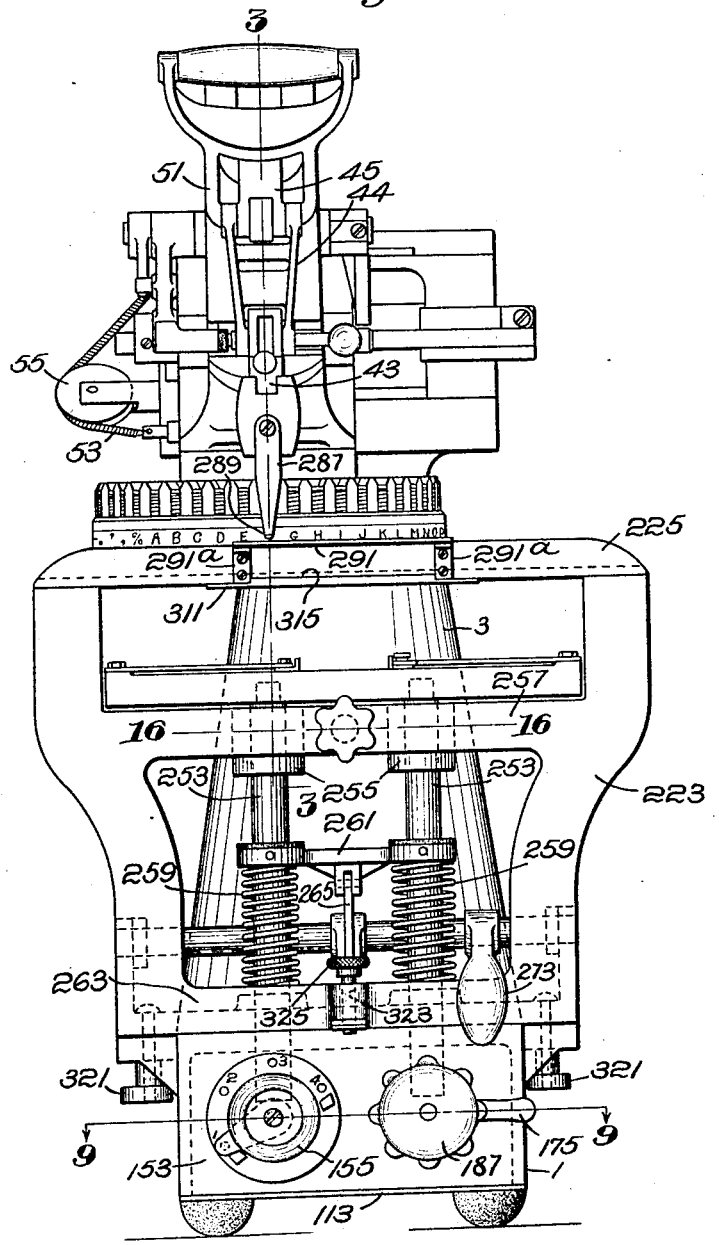
Fig. 1 is a front elevation of the machine for marking articles shown herein as embodying the invention.
Figure 5:
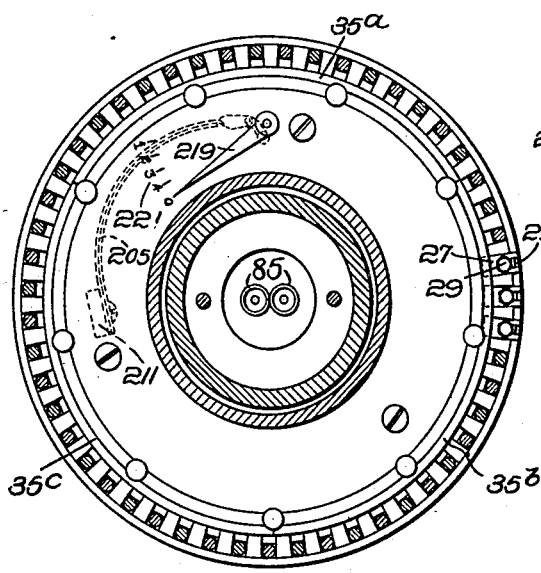
Figure 6:
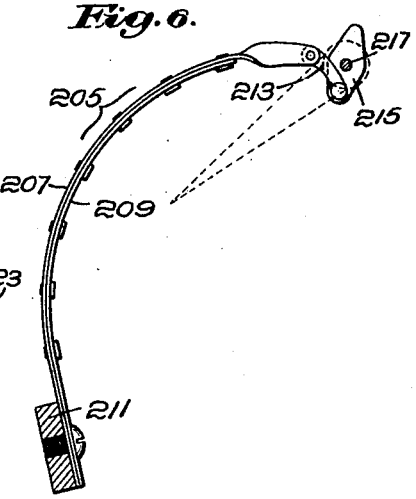
Figure 8:
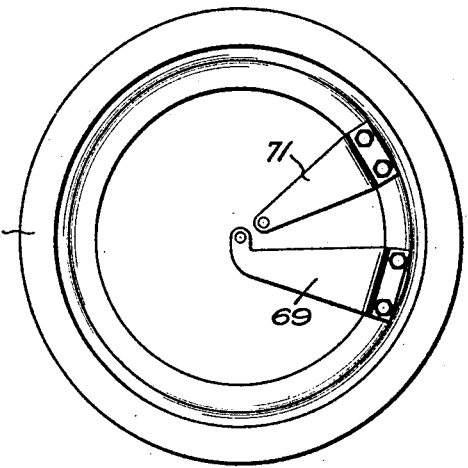
Figure 7:
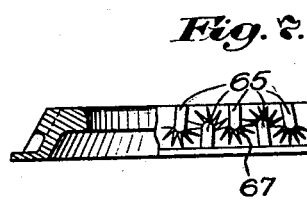
Figure 13:
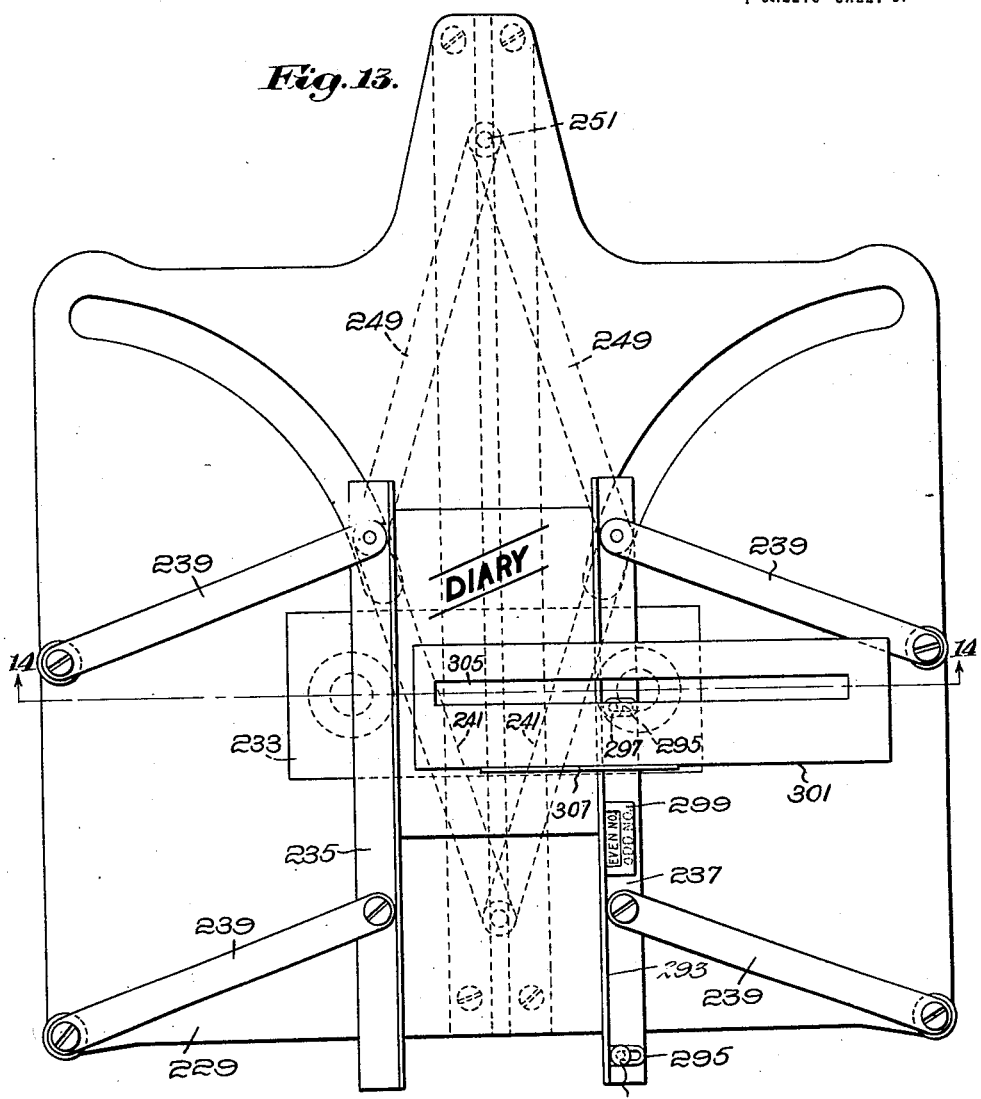
Figure 14:
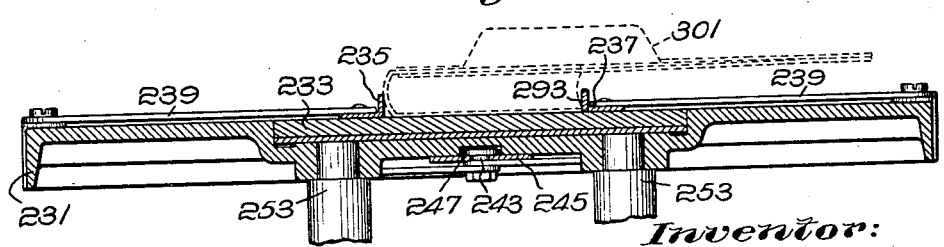

Fig. 3, on an enlarged scale, is a vertical section through the tool carrier, the tool actuating mechanism, and a portion of the work support;

Fig. 4, on an enlarged scale, is a vertical section through a portion of one of the marking tools showing an adjusting device therefor;

Fig. 5 is a horizontal section taken on line 5—5 of Fig. 3;

Fig. 6 is a view, on an enlarged scale, of a thermometer shown in Fig. 5;

Fig. 7 is a view of a heater device shown partly in side elevation and partly in vertical section;

Fig. 8 is a bottom view of the heater device shown in Fig. 7;

Fig. 9, on an enlarged scale, is a horizontal section taken on line 9—9 of Fig. 1 showing the temperature-controlling devices;

Fig. 10 is a device for facilitating the location of the portion of the article to be marked beneath the marking tools;

Fig. 11 is a plan of a device for holding veneers;

Fig. 12 is a diagram of the electrical circuits for the heater;

Fig. 13, on an enlarged scale, is a plan of the table for supporting the articles to be marked;

Fig. 14 is a vertical section taken on line 14—14 of Fig. 13;

Fig. 15 is a plan view showing an index and scale for locating the carrier in position to print matter centrally of the articles;

Fig. 16, on an enlarged scale, is a horizontal section taken on line 16—16 of Fig. 1 showing means for locking the table in different positions of vertical adjustment; and Fig. 17 is a vertical section taken on line 17—17 of Fig. 16.

Referring to the drawings and more particularly to Figs. 1, 2 and 3 thereof, the illustrative machine embodying the invention comprises a frame including a base 1, an upright 3, and a forwardly projecting arm 5 overhanging said base and provided with a dove-tail, horizontal track 7. A head 9 has a dove-tail groove therein fitted on and adapted to slide along said track, rollers 11 being introduced between them to reduce friction.

The head 9 has a neck 13 depending therefrom and preferably integral therewith. An annular tool carrier 15 has a hub 17 journaled on said neck and supported on ball bearings 19 supported in turn by a collar 21 secured to said neck.

The carrier may be provided with tools 23 formed to print letters, numerals or other characters as desired. These tools preferably are made square in cross section and are mounted in similarly shaped holes adjacent the periphery of and extending through the carrier. The tools are normally held up with their printing ends retreated within the carrier by helical springs 25 encircling the upper end portions of the tools and confined between shoulders on said carrier and tabs 27 engaging the heads of screws 29 tapped into said tools. These screws may be adjusted to vary the tension of said springs as desired and to vary the effective lengths of the tools as required. To hold said screws in their positions of adjustment, the tabs may project into recesses 31 cut out of the carrier and each tab may have an upturned flange 33 adapted to engage one or another of the flat faces of the head of the screw 29. Upward movement of said tabs is limited by a ring 35 set in a recess in said carrier and held by thumb screws 37 tapped into a cap ring 39 secured on said carrier. Preferably the ring 35 is made in three sections, 35ª, 35ᵇ, and 35ᶜ (Fig. 5). This will facilitate the insertion and removal of some of the tools without releasing the other tools. In use some of the tools probably will be used more than others and consequently experience a greater amount of wear. It is highly desirable in the production of good work that the impression made by all of the tools should be the same. The flange and tab described enable the effective length of the tools to be varied with a desirable nicety of adjustment for this purpose. If, for example, it is desired to lengthen a tool, it is merely necessary to depress the tab 27 against the resistance of the spring 25 sufficiently to withdraw the flange 33 from engagement with a flat face of the head of the screw. Then the screw can be turned to present another flat face thereof for engagement with said flange and when the tab is released its flange will engage such face and securely hold the screw in its new position of adjustment.

The carrier may have a band 41 (Fig. 2) set in a circumferential recess in said carrier and marked with letters or characters corresponding to the characters on the tools. This will enable the carrier to be readily rotated by the hand to bring the tools progressively at the active printing point to print the matter desired.

To force the tools downward to impress the articles to be marked, the head for the carrier is provided with a plunger 43 (Figs. 2 and 3) connected with toggle links 44 and 45. A spring 47 tends to buckle the toggle and hold the plunger in its upward position, and a cam 49 on a handle arm 51 pivoted on said head is adapted to straighten said toggle when said handle is pulled downward and thereby thrusts the plunger downward and causes the tool beneath it to project beneath the carrier and make its mark upon the article beneath it.

The head is urged along its track to the left by a chain 53 (Figs. 1 and 2) having one end connected to said head, guided around pulleys 55 and 57 and having its opposite end connected to a coil spring 59 anchored to the base of the frame. The head is adapted to feed step-by-step to the right after each depression of said tool-actuating plunger by a pawl and ratchet feeding mechanism 61 (Fig. 3) similar to the mechanism for feeding the head shown in my said patent, and therefore need not be described more in detail herein.

An important feature of the invention relates to electrical means for heating the marking tools. These tools may be heated for the purpose of burning, stamping or embossing the characters in the article marked, or for the purpose of softening an adhesive on a veneer for securing the latter in depressions formed in the article by the impress of the tool, or for other purposes as desired. The illustrative heater shown herein comprises a collar 63 (Figs. 3, 7 and 8) of pressed asbestos or other suitable material having staggered projections 65 on the outer periphery thereof for positioning a resistance coil 67 (Figs. 7 and 12) in an undulatory path on said collar and providing an adequate extent of coil in a minimum space. The ends of said resistance coil may be connected to radial contact fingers 69 and 71 secured to said collar. The collar may be fitted in an annular chamber in the bottom of the tool carrier and be held therein by a plate 73 (Fig. 3) secured to said carrier. The contact finger 69 is somewhat longer than the finger 71 and is adapted to engage the head of a brass screw terminal 75 (Fig. 3) mounted in a central recess in a disc 77 of rubber or other insulation material secured to the cap 21 referred to. The shorter contact finger is adapted to engage an annular contact terminal 79 of brass or other suitable material fitted in an annular recess in said insulation disc. The central contact screw 75 is connected to a conductor 81, and the annular contact 79 is connected to a conductor 83. These conductors are separated from one another adjacent said insulation disc by insulation sleeves 85 and project up through the neck of a cap 87 located in a recess in said head and secured in position by long screws 89 entered through internal ribs in said neck. When current is passed through the conductors 81, 83 and the resistance coil 67, the portions of the carrier receiving the tools will be heated and the heat will be transmitted from the carrier to the tools.

Next will be described means for supplying current to said resistance coil and for controlling the amount of current passed through said coil to vary and conserve the amount of heat supplied thereby as desired. To accomplish this the conductors 81 and 83 may be connected to a plug 91 (Fig. 2) detachably connected to a socket 93 connected in turn to wires 95 and 97 which project down through a flexible metallic tube 99 and a connector 101 secured to a frame 105 adapted to be inserted in a chamber in the base 1. The frame 105 comprises an upper plate 107 and a lower plate 109 preferably of pressed asbestos held in spaced relation by posts 111 secured thereto. A metallic plate 113 may be secured to the bottom asbestos plate 109 to protect and support the same. At the front of the frame 105 is a wall 115 to be referred to and preferably also of pressed asbestos.

The connector 101 is connected by a conductor 117 (Fig. 12) with a socket 119 secured on extensions of the frame plates 109 and 113 and is adapted to be connected by a plug 121 with a conductor leading to a suitable source of electrical current. The connector 101 is also connected to a conductor 123 connected in turn to a contact 125 (Figs. 9 and 12), said contact being connected by a conductor 127 with a series of resistance coils 131, 133, 135 and 137. A switch arm 139 fast on a shaft 141 is adapted to be brought progressively into engagement with contacts 131′, 133′, 135′ and 137′ corresponding to said resistance coils to introduce said coils into or cut the same out of the circuit as desired. The shaft 141 is connected to a conductor 143 connected to the socket 119, and adapted to be connected by the plug 121 with a conductor leading to the main negative line.

When the switch arm 139 engages the contact 131′ merely the coil 131 will be introduced into the circuit. If it is desired to reduce the temperature the switch arm may be shifted into engagement with the contact 133′, thereby introducing the resistance coils 131 and 133 into the circuit. Similarly the coils 135 and 137 may be added further to reduce the temperature of the heater as desired.

The shaft 141 may have a head 141$^a$ (Fig. 9) adapted to press said switch arm against a washer 141$^b$ when acted upon by a helical spring 141$^c$ confined between a washer 141$^d$ and a ring 141$^e$ fast on said shaft. The wire 143 may be secured to said shaft by binding nuts 144 (Fig. 2).

To rotate the shaft 141 of the switch arm, it may be provided with a fin 145 (Fig. 9) adapted to enter a corresponding slot in the face of a disc 147 of rubber or other insulation material secured in a socket 149 on an end of a short shaft 151 journaled in a bearing in the front plate 153 of the machine base. The outer end of said shaft has a handle 155 fast thereon. An index 157 is secured to said shaft and has a nub 159 adapted to slick over holes 161 in a dial plate marked to correspond with the resistance coils 131, 133, 135 and 137. Thus the handle may be readily rotated and by reference to said index the resistances may be introduced into and cut out from the circuit as desired.

The fin 145 on the shaft 141 and the groove in the insulation disc 147 on the shaft 151, enable the two shafts to be readily connected in the course of and incidental to the insertion of the frame 105 into the machine base without further adjustment.

In some cases it may be desirable to bring the heater to a higher temperature than that had when the resistance coil 131 is in the circuit therefor. To accomplish this a conductor 163 (Fig. 12) may be connected to the switch shaft 141 by the binding nuts 144 and may be also connected to a contact 165 adjacent the contact 125 referred to. These contacts are adapted to be connected by a jump switch or bridge contact 167 (Fig. 9) slidably mounted on a pin 168 which has reverse conical portions 168$^a$ and 168$^b$ embraced by a circular coil spring 168$^c$ carried by said switch. A coil spring 169 tends to thrust said pin downward viewing Fig. 9. In moving to this position the circular spring contracts. The force of contraction is perpendicular to the axis of the cone and has a component perpendicular to its surface and one parallel thereto. The action of this latter component causes the switch to move along the conical portion 168$^b$ away from and breaks the circuit at said fixed contacts 125 and 165. When said pin 168 is thrust upward against the resistance of the coil spring 169 the circular spring 168$^c$ rides along said pin to the other conical portion 168$^a$ thereof and shifts the switch into engagement with said contacts 125 and 165 thereby closing the circuit. When the two contacts are connected all of the resistance coils 131, 133, 135 and 137 will be cut out of the circuit and the highest temperature for the heater will be obtained. To shift said switch inward to close said circuit its pin 168 (Fig. 9) may project through the front wall 153 of the frame 105 into a cup casing 173. A hand lever 175 has one end pivotally connected to said casing and its opposite free end projecting out through an opening 177 in said casing. This lever is normally held in its position shown in Fig. 9 by a coil spring 179 confined between the base of said casing and said lever. When it is desired to obtain the highest temperature for the heater the hand lever is thrust inward thereby causing the switch 167 to connect the contacts 125 and 165 as described. As soon as the handle is released, however, the switch-actuating spring 169 will promptly break the circuit. This is important because it prevents any possibility of inadvertently leaving the switch shifted to complete the circuit for raising the heater to its highest temperature.

In some cases it may be desirable to automatically maintain said highest temperature for the heater a predetermined length of time without the inconvenience of manually holding the lever 175 in position to complete the circuit. To accomplish this the cup casing 173 may be provided with a spider 181 therein having a boss 183 projecting therefrom and receiving a pin 185 having one end adapted to engage the lever 175 in alinement with the switch pin 168, and its opposite end connected to a cap 187 having a flange 189 fitting on said casing. A coiled clock spring 191 may have one end anchored to a post 193 secured to said spider, and its opposite end connected to an internal boss 195 on said cap and tapped to the spider boss 183 referred to. A helical spring 197 may be mounted in said bosses, encircle the pin 185 and be confined between the bases of said bosses. The cap flange may have projections 199 thereon to facilitate manual grasping and rotation thereof. Inward movement of the cap may be limited by a stop 201 on the outer wall of said casing.

When it is desired to maintain the plug switch closed for a predetermined length of time the cap 187 is rotated, thereby screwing the same inward until the flange 189 engages said stop. This rotation of the cap will tension the springs 191 and 197 and thrust the pin 185 inward. The latter in turn will press on the lever 175 and thrust the switch actuating pin 168 inward, thereby completing the circuit to the heater for producing the highest temperature. When the cap is released the springs energized as described will become effective to gradually rotate said cap in the opposite direction, thereby gradually thrusting the pin 185 outward. This pin is followed by the lever 175 and the switch pin 168. When said pins, however, move outward sufficiently the switch will break the connection between contacts 125 and 165 and the circuit to the heater will be broken. The pin 185 may have a flanged head 203 to engage said spider and limit the outward movement of said pin.

When the cap is screwed inward to its stop, the clock spring will be tensioned to its fullest extent and consequently immediately on release of the cap it will tend to rotate outward more rapidly than after the spring has relaxed somewhat. However, when the cap is in its inward position, more of the threads on the parts 183 and 195 are engaged and the spring 197 is under compression and therefore firmly presses such threads together. The friction during the initial movement of the cap is therefore greater and such movement is retarded. Thus the cap is automatically shifted gradually outward to allow the desired predetermined amount of time to elapse before the jump switch 167 will snap to its position shown in Fig. 9 and break the circuit to the heater.

To indicate whether or not current is passing through the circuit for the heater, a lamp 204 (Fig. 12) may be introduced therein.

To show the temperature of the marking tools, a suitable thermometer may be provided adjacent thereto. Herein, a thermometer 205 is provided (Figs. 5 and 6) comprising a steel strip 207 and a copper strip 209 superposed and riveted together. One end of this thermometer is secured to a lug 211 on the cap ring 39 referred to above the tool carrier. The opposite free end of the thermometer is connected by a link 213 with an arm 215 fast on a shaft 217 journaled in a cover plate 219 (Fig. 3) above the cap ring and forming a chamber therebetween to contain said thermometer. On the upper end of said shaft which projects above the cover plate is an index 219 cooperating with a scale 221 on said plate suitably graduated and marked to register the temperature. When the current is passed through the heater its temperature will be raised and the copper strip 209 having a greater coefficient of expansion than the steel strip 207, will lengthen more than and straighten the latter against the resistance of its inherent resilience. This will cause the free end of the thermometer to move to the left (Figs. 5 and 6) and rock the index shaft 217 in a clockwise direction and the temperature will be registered thereby. When the temperature lowers, the spring in the steel strip will tend to return the thermometer to its original position and rock the index shaft in a contraclockwise direction back to its original position. The thermometer located between the top ring and the cover ring as described is desirably closely adjacent to the tools to receive substantially the same temperature as said tools and is protected by said cover ring.

Next will be described means for supporting the articles to be marked. The means to be described may support a variety of different articles, but for purposes of illustration the article selected herein to be marked is a book or diary.

Referring now to Figs. 1 and 2, the support comprises a standard 223 having a top plate 225 beneath the tool-actuating plunger 43 referred to and beneath the front edge of the tool carrier. This plate may have an elongated opening 227 through which the tools may project to engage and mark the article pressed up against the bottom of said plate as more fully hereinafter described.

Beneath said plate is a table 229 (Fig. 13) having a flange 231 (Fig. 14) depending from the rim thereof to strengthen the same, and a central, oblong recess in which may be set a plate 233 of hardened steel or other suitable material. A pair of parallel slide bars 235 and 237 are adapted to slip over said table and receive the book between them. Each of these bars is pivotally connected to a pair of links 239 which are pivotally connected in turn to said table adjacent the edge thereof. Thus the bars may be moved toward or from one another to receive different sized articles, but will always remain parallel to opposed edges of said table. To maintain said bars at equal distances from said opposed edges, they may be pivotally connected to ends of converging links 241 having meeting ends pivotally connected to a bolt 243 adapted to slide in a slot in a plate 245 secured to the under face of said table, the latter having an elongated recess 247 to accommodate the head of said bolt. Said guide bars may also be pivotally connected to another pair of converging links 249 having meeting ends pivotally connected to a bolt 251 adapted to slide in the slot in said plate 245. By this construction if one of the guides is grasped and moved, its opposed companion guide will share the same movement and a book or other article introduced between said guides may be accurately positioned centrally on said table with its sides parallel to the sides of said table, thereby insuring the marking of the book on a line perpendicular to the side edges of said book.

The table 229 may be mounted on the upper ends of posts 253 (Figs. 1, 2, 13, 16 and 17) adapted to slide through bosses 255 on a horizontal bar 257 of said standard located a substantial distance beneath the top plate 225 thereof. These posts are urged upward to press the book against the bottom of said top plate by helical springs 259 encircling said posts and confined between a bridge member 261 fast on said posts and between a horizontal base plate 263 of said standard.

To press said posts downward against the resistance of said springs, said bridge bar may be connected by a link 265 (Figs. 1 and 2) with an arm 267 fast on a horizontal shaft 269 journaled in ears 271 projecting rearward from said standard. The handle arm 273 fast on said shaft projects forwardly somewhat beyond and is accessible in front of said standard. By pressing on this handle the bridge bar 261 will be pulled downward, thereby depressing the posts and the table mounted thereon. This will remove the table sufficiently from the top plate to permit the book or other article to be readily positioned thereon. Then the handle lever may be gradually eased upward allowing the springs to press the book automatically against the bottom of said top plate in position for printing.

To lock the table in any of its positions, toggle shoes 275 (Figs. 16 and 17) may be provided, pivotally connected to a nut 277 threaded on a portion of a shaft 279 having smooth portions adapted to slide longitudinally or rotate in bearings on the horizontal bar 257 on the standard 223. The shaft is urged in a clockwise direction by a helical torsion spring 281 encircling the same and secured to the front face of said bar and a handle 283 on an end of said shaft. The outward movement of said shaft is limited by a collar 285 fast thereon adapted to engage the inner end of one of the bearings of said shaft. The spring 281 tends to thrust the nut 277 in a direction to straighten the toggle shoes 275 and press the same against the posts 253, the latter in turn being pressed against the walls of the bosses in which they are mounted. Thus the posts and the shafts may be securely held in any desired position of vertical adjustment. When it is desired to adjust the table vertically, it is merely necessary to turn the knob 283 slightly in a contra-clockwise direction (Fig. 16), thereby buckling the toggle and permitting the table to be lifted or lowered under the control of the hand lever 273 referred to.

An important feature of the invention relates to means facilitating the location of the head in position to print a line with equal margins at the side edges of the book or other article. To accomplish this, an arm 287 (Fig. 2) is secured to the front of said head opposite the tool-actuating plunger and depends from said head, presenting an index 289 (Figs. 2 and 3) cooperating with a scale on a plate 291 supported by brackets 291ª secured to the front edge of the top plate 225 of the work-supporting standard. This scale comprises alternating long and short graduations marked with even numbers, for example, from two to thirty-two, said numbers corresponding to the total numbers of letters or step adjustments of the head essential to print the matter contained in a line. A given number on the scale is situated at such a distance from the middle point of the work support that a movement corresponding to half as many feed steps will bring such middle point beneath the printing members. Thus, if the article on which printing is to be done is placed symmetrically on the work support and the pointer adjusted to the mark corresponding to the number of elements in the legend which it is desired to print, the legend will be arranged symmetrically on the book since half the necessary number of steps will bring the printing to the middle point of the work support and, also, to the middle point of the article.

To further illustrate the use of the scale it may be supposed it is desired to print the name "John Doe" on the cover of a diary. First the diary is positioned between the guide bars 235 and 237 as shown in Fig. 13. There are seven letters in the name "John Doe" and one space between them. Therefore the head should travel eight steps in printing said name. Consequently the head is positioned with its index 289 opposite the graduation numbered eight. Then the tool carrier is rotatably adjusted to progressively bring the letters in said name beneath the tool-actuating plunger. After each operation of the plunger the head is automatically advanced a step along its track and will print the name with equal margins between it and the edges of the book without further attention thereto.

If it is desired to print matter containing an add number of letters or requiring the head to travel an odd number of steps, the head is adjusted to bring its index opposite the graduation having a number which is next higher than the total number of letters in the word. For example, "Richard Roe," including the space betwen the first and last names, requires eleven spaces of travel of the head. Therefore the latter would be adjusted to bring the index opposite the scale graduation numbered twelve. If the name were now typed it would cause the same to be written with less margin at the left than at the right of the name. To compensate for this, the guide bar 237 may be provided with an edge member 293 (Fig. 13) having ears 295 projecting therefrom slotted to receive thumb screws 297 tapped into said guide bar 237. This will permit said edge member to be adjusted toward the guide bar 235 to shift the book to the left of Fig. 13 sufficiently to compensate for the error in adjustment indicated by the index. In other words, the edge member should be adjusted toward the guide member 235 a distance equal to one-half the width of a letter. To indicate the adjustment of the edge member 293 for even and odd numbers of letters, the guide member 237 may have the words "Even No." and "Odd No." marked thereon and the edge member may have a plate 299 projecting therefrom adapted to conceal one or another of said designations according to the postion of the edge member required.

As stated the index and scale referred to enable the proper location of the matter to be marked on the book with respect to the side edges thereof. It is also desirable properly to locate the matter between the end edges of the book. To accomplish this, a clip 301 (Fig. 10) may be provided of copper or other suitable material comprising a leaf 303 having an elongated aperture 305 (Fig. 13) therein corresponding to the aperture 227 in the top plate of the standard referred to. A flange 307 projects upwardly from said leaf and is adapted for engagement with the front edge of said top plate. A tongue 309 is fixed to one end of said leaf and has sufficient resilience to allow the same to be spread somewhat therefrom. In use this clip is applied to the book with its leaf above the cover and its tongue beneath the cover. When the cover of the book is closed the clip will be held securely in any position to which it may be adjusted on the book. The clip may readily slide along said cover to bring its opening at the point where it is desired to locate the matter to be printed. Then the book may be adjusted along the table between the guide bars 235 and 237 until the flange 307 of said clip engages the front edge of said top plate. This will bring the aperture of the leaf of the clip in registration with the aperture in said top plate and insure the printing on the cover of the book at the point selected. The tongue of the clip may also serve desirably as a platen to furnish support for the book.

In some cases it is desirable to impress characters from a veneer onto the article to be marked. Frequently gold leaf is used for this purpose. In printing gold leaf characters, a sheet of gold leaf is introduced between the tools and the article to be marked, and when the tools are pressed against the article they die out the characters from the leaf and impress the same into the surface of the article. Considerable difficulty has been experienced in applying gold leaf letters to articles for the reason that the gold leaf is very fragile and difficult to handle. However, by mounting the leaf on a planished surface in the manner shown in my copending application, Serial No. 86,487, filed March 24, 1916, the difficulty in handling the gold leaf and producing perfect characters therefrom has been eliminated.

One of the features of the present invention is a convenient holder 311 (Fig. 11) for gold leaf and other veneers. This holder comprises an elongated strip 313 of copper or other suitable material preferably having rounded ends, and opposed edge flanges 315 bent up from said strip, curved inward, and of resilient material. The strip may have a pair of elongated apertures 317 through which the marking tools may project. Spring clips 319 may be struck up from said strip and serve to hold the veneer on said strip. After the veneer has been placed in the holder, the latter is presented to the bottom of the top plate 225 of the standard between the scale plate brackets 291ª thereon and held in this position by the frictional engagement of the spring flanges 315 thereof with the front and rear edges of the top plate. When the article to be marked is pressed upward toward said top plate by the table supporting the same, it will engage the veneer holder and further assist in holding the same to said top plate.

When the marking tools are thrust downward toward the article, they will pass through one of the elongated apertures 317 and die out from the veneer the characters and impress the same in the surface of the article.

The elongated slot 227 in the top plate 225 may be nearer the rear than the front edge of said plate and merely one of the elongated apertures in the holder may be in registration with said top plate slot at a time. After characters have been died from the veneer located over one of said apertures, the holder may be removed from said top plate and its other aperture be brought into registration with said top plate slot.

Thus by a simple operation two lines may be printed from the veneer carried by the holder.

The book or other article may be readily slid along the table between the guide bars according to the number of lines desired to be printed thereon, or the standard 223 may be bodily adjusted forward or backward for line spacing. To permit such adjustment said standard may be provided with hand bolts 321 (Fig. 1) entered through elongated slots in the base plate of said standard and through openings in the base of the frame. This will permit the standard to be slid readily forward or backward and held in different positions of adjustment. To locate the adjustment of said standard it may be provided with a spring-pressed pin 323 (Figs. 1 and 2) having a handle 325 and adapted to enter holes 327 in said frame base. This spring-pressed pin will automatically drop into one or another of said holes when the standard is slid forward or backward to its proper position and then the hand bolts may be tightened to hold the standard in position.

While the machine has been described more particularly with reference to its use in marking books, it will be understood that its field of use is not restricted thereto, but that a great variety of articles may be marked thereby.

The machine described enables articles to be quickly and readily, accurately adjusted and positively held in position to be marked. The heater and its controller enable the temperature of the tools to be quickly raised to the desired point for properly doing their work and enable the temperature of the tools to be controlled with a desirable nicety for work of varying character and under varying conditions as required.

It will be understood that it is not indispensible that all of the features of the invention shall be used conjointly, since some of them may be used separately to advantage.

Having described one illustrative embodiment of the invention without limiting the same thereto, what I claim as new and desire to secure by Letters Patent is:

1. A machine for marking articles comprising in combination, a carrier, tools thereon, means for heating said tools, a ring on said carrier adjacent said heating means, a thermometer on said ring, a cover ring above said first-named ring, a shaft journaled in said cover ring connected to said thermometer, and an index on said shaft for indicating the registration of said thermometer.

2. A machine for marking articles comprising in combination, a carrier, tools thereon, a heater for said tools, superposed rings on said carrier, a metallic thermometer between said rings, a shaft, a dial on one of said rings, and an index connected to said shaft cooperating with said dial to indicate the temperature of said heater.

3. A machine for marking articles comprising in combination, a carrier having holes therein and recesses above said holes, marking tools mounted in said holes and projecting into said recesses, said tools having screws connected thereto, and tabs cooperating with said recesses and the heads of said screws to prevent rotation of the latter relatively to said tools.

4. A machine for marking articles comprising in combination, a carrier having holes therein and recesses above said holes, tools mounted in said holes having screws projecting into said recesses, and members on said screws having flanges to engage the flat faces of the heads thereof and cooperating with said recesses to lock said screws against rotation.

5. A machine for marking articles comprising in combination, a carrier having holes therein, tools mounted in said holes and having screws threaded thereto, and means including members having flanges to engage flat faces of the heads of said screws to prevent rotation thereof.

6. A machine for marking articles comprising in combination, a carrier, tools therein having screws threaded thereto, and means including elements having portions to engage flat faces of the heads of said screws to prevent rotation thereof.

7. A machine for marking articles comprising in combination, a carrier having holes therein, tools in said holes, screws threaded to said tools to vary the effective length thereof, springs encircling said screws, and tabs pressed by said springs against the heads of said screws and having flanges cooperating with flat faces of said heads to prevent rotation of said screws relatively to said tools.

8. A machine for marking articles comprising in combination, a carrier having holes therein, tools in said holes, and means to position said tools including a ring on said carrier, screws threaded to said tools, tabs having flanges for engagement with flat faces of the heads of said screws, and springs confined between a part of said carrier and said tabs for pressing the latter against said ring and the heads of said screws.

9. A machine for marking articles comprising in combination, a carrier, tools thereon, screws threaded into said tools adjustable to vary the effective length thereof, and means cooperating with the flat faces of the heads of said screws to lock the same in different positions of rotative adjustment relative to said tools.

10. A machine for marking articles comprising in combination, a carrier, tools thereon, screws threaded to said tools to vary the effective length thereof, and means to lock said screws into different positions of adjustment relative to said tools determined by the flat faces of the heads of said screws.

11. A machine for marking articles comprising in combination, a carrier, tools mounted thereon, a sectional ring detachably secured to said carrier, elements on said screws, and springs for pressing said elements against said ring to limit upward movement of said tools.

12. A machine for marking articles comprising in combination, a carrier 15, tools 23 thereon, screws 29 for varying the effective length of said tools, and elements 27 on said screws having flanges 33 cooperating with the heads of said screws to limit adjustment of said screws relatively to said tools.

13. A machine of the class described comprising in combination, a standard having a top, a work-supporting table, posts connected to said table adapted to slide on said standard, a bridge member connecting said posts, coil springs encircling said posts confined between said bridge member and a part of said standard and tending to shift said table toward said top, and means including a handle for lowering said table against the resistance of said springs.

14. A machine of the class described comprising, in combination, a standard, a work supporting table thereon, means for operating on work supported by the table, a pair of parallel guide members overlying said table and adapted to receive an article between them, a pair of parallel links pivoted to the outer side of each member and to the table whereby to maintain parallelism of said members while preserving an unbroken supporting surface of substantial area between them.

15. A machine as described in claim 14 wherein means are provided to transmit movement from either of said members to the other but in opposite direction.

16. A machine of the class described comprising in combination, a standard, a work support thereon, means for operating on work held on said support, parallel members on said support thereon to receive an article between them, parallel motion links pivotally connected to said members and support, and a pair of links pivotally connecting said members to transmit movement from either to the other.

17. A machine of the class described comprising in combination, a standard, a work support thereon having a guideway therein, guide members on said support for positioning an article between them, parallel motion links pivotally connected to said members and support, a pair of links having ends pivotally connected to said members, and a pin pivotally connecting the opposite ends of said links and adapted to slide in said guideway.

18. A machine of the class described comprising in combination, a standard, a work support thereon having a guideway therein, guide members on said support for positioning an article between them, parallel motion links pivotally connected to said members and support, pairs of links each having ends pivotally connected to said members, and a pin pivotally connecting the opposite ends thereof and adapted to slide in said guideway.

19. A machine of the class described comprising, in combination, means for operating on an article, a table for supporting articles for operation of said means thereon, guide members on said table, parallel motion links connecting the same thereto, said table being slotted and means beneath the table connected to said members through the slots for enforcing equal and opposite movements thereof.

20. A machine of the class described comprising, in combination, means for operating on an article, a table for supporting articles for operation of said means thereon, guide members on said table, parallel motion links connecting the same thereto, said table being slotted, a guideway beneath the table, a slide movable therein and links carried by said slide and connected to said members through the slots.

21. A machine of the class described comprising in combination, a standard, a work support thereon, posts connected to said support, and toggle means on said standard between said posts and adapted to be straightened to force the arms of the toggle equally toward said posts for locking the same to said standard.

22. A machine of the class described comprising a standard, a work table having depending posts guided in the standard, a toggle carried by said standard and interposed between said posts to bear on the same, said toggle being disposed in a plane transverse to said posts, and an operating handle for the toggle projecting transversely from the standard.

23. A machine of the class described comprising in combination, a standard, a work support thereon, posts connected to said support and guided on said standard, a shaft on said standard between said posts, and toggle shoes pivotally connected to said shaft for locking said posts to said standard.

24. A machine of the class described comprising in combination, a standard, a work support thereon, posts connected to said support and guided by said standard, a shaft, a nut threaded thereon, and toggle shoes pivotally connected to said nut for engagement with said shaft to lock the same to said standard.

25. A machine of the class described comprising in combination, a standard, a work support adjustably mounted on said standard, and means to lock said support in different positions of adjustment including a toggle, spring means tending to straighten said toggle to lock said support, and manually operable means to buckle said toggle to release said support.

26. A machine of the class described comprising in combination, a standard, a work support adjustably mounted thereon, and means to lock said support in different positions of adjustment including a shaft, a nut threaded thereon, toggle shoes pivotally connected to said nut, and spring means tending to shift said shaft to straighten said toggle.

27. A machine of the class described comprising in combination, a frame, means for marking articles thereon adjustable step-by-step relatively to said frame, an index on said marking means, a standard, a support on said standard for an article to be marked, and a dial on said standard having graduations marked to indicate the initial adjustment of said marking means to print matter on an article symmetrically with respect to edges thereof.

28. A machine of the class described comprising in combination, means for marking articles, an index on said means, a standard, a work support thereon, means to locate an article to be marked in a predetermined position on said support, and a dial plate on said standard having graduations cooperating with said index and marked to indicate the initial printing position of said marking means for printing matter symmetrically with respect to edges of said article.

29. A machine of the class described comprising in combination, means for marking articles, a work support, and positioning means on said support for locating an article in one position to be marked with an even number of characters, and in a different position for an odd number of characters.

30. A machine of the class described comprising in combination, means for marking articles, a work support, positioning means on said support for locating an article in one position to be marked with an even number of characters, and in a different position for an odd number of characters, and means for indicating the adjustments of said positioning means.

31. A machine of the class described comprising in combination, means for marking articles, a work support 229, guide members 235, 237 for locating an article thereon to receive a line containing an even number of characters, and an element 293 adjustable relatively to one of said guide members for locating the article to receive a line containing an odd number of characters.

32. A machine of the class described comprising in combination, a standard, a work support thereon, means for locating an article on said support in position to receive a printed line perpendicular to a side edge of the article, and a clip having means for connection with the article and cooperating with said standard to locate the position of a line with respect to the ends of the article.

33. A machine of the class described comprising in combination, a standard, a work support thereon, means for locating an article in position to receive a printed line perpendicular to a side edge of the article, and a clip for application to the article having a flange for engagement with said standard to locate the article in position to receive said line at a predetermined point relative to the ends of the article.

34. A machine of the class described comprising in combination, a standard provided with a plate having an opening therein, a work support, and a veneer holder having a slot for registration with the slot in said plate and for positioning a veneer between said plate and an article on said support.

35. A machine of the class described comprising in combination, a standard provided with a plate having an opening therein, a veneer holder having openings therein for alternative registration with the opening in said plate, and means for positioning an article beneath said holder.

In testimony whereof, I have signed my name to this specification.

WILLIAM E. CHOATE.